United States Patent [19]

Firester

[11] 4,030,046

[45] June 14, 1977

[54] PREALIGNED LASER MOUNT AND METHOD OF MAKING SAME

[75] Inventor: Arthur Herbert Firester, Skillman, N.J.

[73] Assignee: RCA Corporation, New York, N.Y.

[22] Filed: May 22, 1975

[21] Appl. No.: 579,968

[52] U.S. Cl. .................................... 331/94.5 D
[51] Int. Cl.² .................................... H01S 3/03
[58] Field of Search ............... 331/94.5; 330/4.3

[56] References Cited

UNITED STATES PATENTS

| | | | |
|---|---|---|---|
| 3,683,300 | 8/1972 | Hohenstein | 331/94.5 D |
| 3,784,927 | 1/1974 | Rudolph | 331/94.5 D |
| 3,794,431 | 2/1974 | Rothrock | 331/94.5 D |
| 3,904,986 | 9/1975 | Hernqvist | 331/94.5 G |

*Primary Examiner*—William L. Sikes
*Attorney, Agent, or Firm*—Glenn H. Bruestle; George E. Haas

[57] ABSTRACT

Two ring mounts extend around and are secured to a gas laser discharge tube. The ring mounts are positioned near opposite ends of the laser tube. The laser discharge tube is in a prealigned relationship to the external perimeter of each ring mount. The mounts serve as the means for mounting the laser discharge tube. The mounts are formed by placing the laser discharge tube within two molds and aligning the laser output beam with respect to the molds. Plastic material is then forced into the molds and allowed to harden so as to permanently fix the aligned relationship of the tube with respect to the mold.

4 Claims, 3 Drawing Figures

U.S. Patent    June 14, 1977    4,030,046
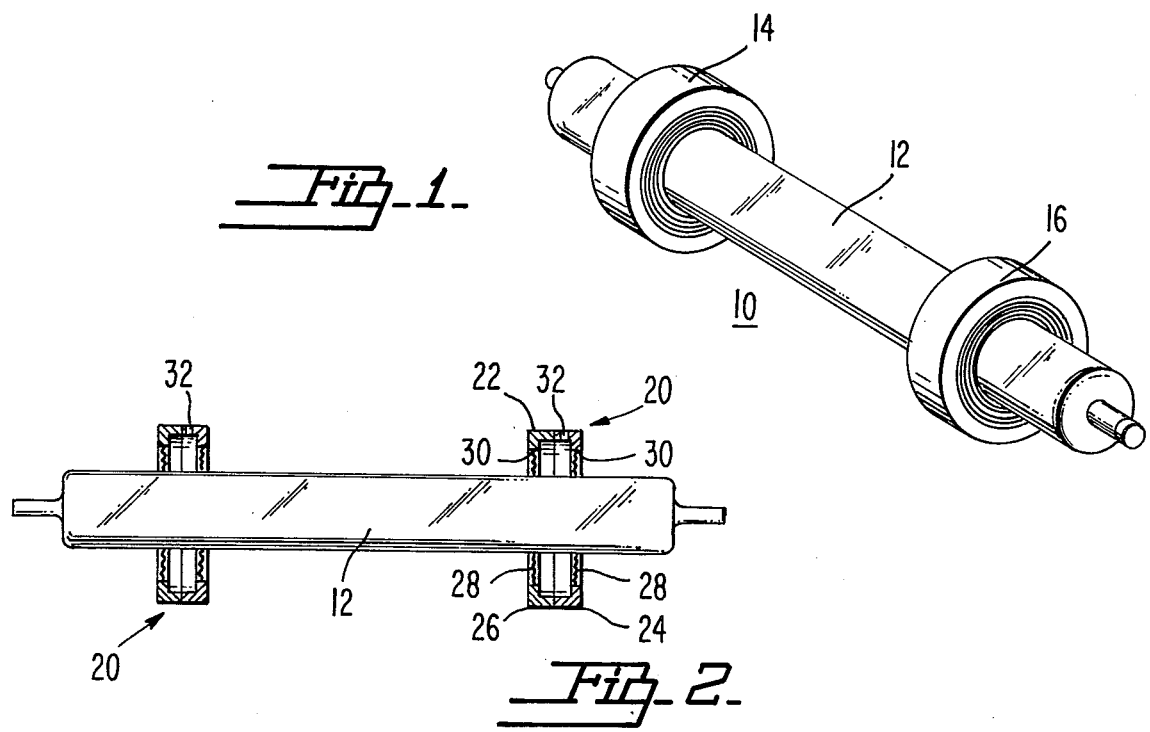
Fig. 1.
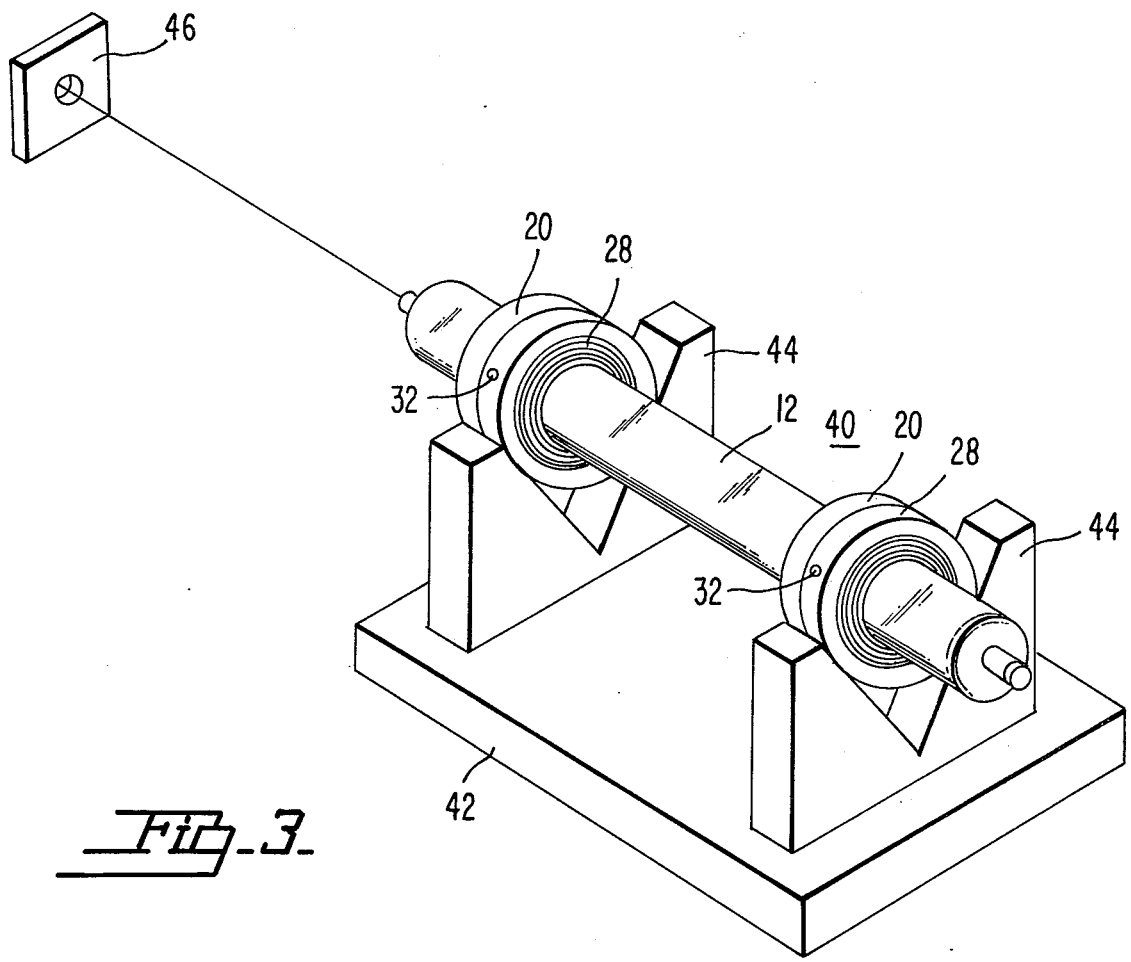
Fig. 2.
Fig. 3.

PREALIGNED LASER MOUNT AND METHOD OF MAKING SAME

BACKGROUND OF THE INVENTION

This invention relates to gas laser discharge tube mounting means and the method for forming the mounting means.

Gas laser discharge tubes often must be aligned with respect to the apparatus in which they are to be used. In the past, this has been typically accomplished by mounting the laser tube within the enclosure and aligning the beam with respect to the enclosure. Heretofore this alignment within the enclosure had been accomplished by positioning the laser tube by means of adjustable mounts such as screws and then bonding the tube to the enclosure in a manner so as to maintain the alignment, as shown in U.S. Pat. No. 3,847,703 issued on Nov. 12, 1974 to Donald Kaiser. The finished product of this alignment method was an enclosure containing the laser tube.

SUMMARY OF THE INVENTION

Two ring mounts extend around and are secured to a laser tube near opposite ends of the laser tube. The ring mounts are formed by placing the laser tube in adjustable molds. The laser tube is then aligned with respect to the molds and a molding material is poured into the molds. The molding material is then allowed to harden permanently fixing the alignment of the laser tube and forming the ring mounts.

BRIEF DESCRIPTION OF THE DRAWING

FIG. 1 is a perspective view of a laser tube having the ring mounts.

FIG. 2 is a sectional view of a step in the method for forming the mounts.

FIG. 3 is a perpective view of a method for aligning the laser tube.

DETAILED DESCRIPTION OF THE INVENTION

With initial reference to FIG. 1, a laser assembly, generaly designated as 10, includes a gas laser discharge tube 12 and first and second ring mounts 14 and 16 respectively. The two ring mounts 14 and 16 extend around and are fixedly mounted to the laser tube 12. The first ring mount 14 is positioned near one end of the laser tube 12 while the second ring mount 16 is positioned near the other end. Both of the ring mounts 14 and 16 are made out of a molded material such as plastic. The two mounts 14 and 16, shown in FIG. 1, have a cylindrical shape however, the ring mounts may take on other geometrical configurations. Regardless of the geometry of the ring mounts, the laser beam produced by the tube 12 is in a fixed alignment with respect to the perimeter of the ring mounts. This enables the laser tube to be removed from the device in which it is used and replaced in the device without having to realign the laser beam.

Each ring mount is produced using molds 20 as shown in FIG. 2. Each mold comprises a ring 22 which has a generally U-shaped longitudinal cross sectional configuration. Each ring 22 has two sections 24 and 26 which are held together by clamping means (not shown). In an alternate configuration, the mold might be split along a diameter. A bellows 28 extends inwardly from and is mounted to the inner perimeter at each end 30 of the U-shaped ring 22. In the center of the bellows is a circular aperture. The bellows is formed so that both the size and shape of the aperture can conform to the laser tube periphery, and so that the relation of the external mold surface to the laser tube can be varied for alignment orientation. The exact nature of the bellows 28 will be better understood by a description of the function of the ring mold 20.

The two ring molds 20 are positioned near opposite ends on a laser tube 12 so that the tube extends through the apertures in the bellows 28. The bellows 28 are sufficiently rigid so as to support the laser tube within the inner diameter of the U-shaped ring 22 while permitting the tube to move within the ring. The laser tube is then aligned with respect to the mold. The ring mold and laser tube assembly 40 is placed on an alignment fixture 42 as shown in FIG. 3. The ring molds 20 are placed in the V-blocks 44. The laser tube 12 is then activated and the laser beam is aligned with respect to a target 46. A method similar to that shown in U.S. Pat. No. 3,847,703 issued on Nov. 12, 1974 to Donald Kaiser may be used in the alignment. During the alignment, the rigidity of the bellows 28 could be sufficient to hold the laser tube at various positions within the ring mold 20. This procedure aligns the laser beam with respect to the ring mold 20.

Once the alignment has been completed, molding material such as a plastic may be injected or poured into the mold 20 through an aperture 32 in each U-shaped ring 22. The molding material is then allowed to harden within the mold 20 so as to adhere to the laser tube 30 and form the ring mounts 14 and 16 (FIG. 1). The hardening of the molding material holds the laser tube in the alignment position. The mold then can be divided by loosening the clamping means which holds the two sections 24 and 26 together and separating the ring mold 20 from the hardened molding material inside the mold. The laser is now in permament alignment with the perimeter of the ring mounts 14 and 16. Alternately the ring mold 20 can be left on the hardened molding material and the mold itself then forms part of each ring mount 14 and 16. If this latter method is used, the U-shaped ring 22 may be formed of a single piece rather than the two sections 24 and 26.

We claim:

1. A gas laser discharge tube and mount comprising:
   a gas laser discharge tube in the form of a closed gas confining envelope,
   a first ring mount extending around the tube, the first ring mount positioned and fixedly attached to the tube near one end of the tube; and
   a second ring mount extending around the tube, the second ring mount positioned and fixedly attached to the tube near the other end, the tube being in an aligned relationship with the perimeter of the first and second ring mounts.

2. The device as in claim 1 wherein the ring mounts are cylindrical.

3. The device as in claim 1 wherein the ring mounts are formed of plastic.

4. The device as in claim 1 wherein each ring mount comprises:
   a ring mold extending around the tube; and
   molding material securing the ring mold to the laser tube in an aligned relationship.

* * * * *